3,047,564
PURIFICATION OF IMPURE α-AMINOLACTAMS
Willem Pesch and Ulrich Verstrijden, Geleen, Netherlands, assignors to Stamicarbon N.V., Heerlen, Netherlands
No Drawing. Filed Sept. 12, 1960, Ser. No. 55,201
Claims priority, application Netherlands Sept. 15, 1959
7 Claims. (Cl. 260—239.3)

The present invention relates to a process for purifying α-aminolactams in aqueous reaction media containing same. The invention is of particular application to the purification of α-aminolactams prepared by the reduction of α-nitrolactams in water.

In the preparation of α-aminolactams by reduction of α-nitrolactams, there is generally obtained an aqueous α-aminolactam solution which is contaminated with non-converted α-nitrolactam, the hydrolysis product of α-aminolactam, and various complex compounds of the catalyst and one or several of the reagents.

The α-aminolactam may be recovered from this solution by vacuum distillation. However, if this is done, there is the drawback that part of the α-aminolactam decomposes during the distillation. Depending on the pressure used and the corresponding temperature at the bottom of the distillation vessel, about 10 to 30% of residue is formed. In addition, the originally white α-aminolactam discolors when left standing for some time.

The principal object of the present invention is to provide a process for purifying α-aminolactams from an aqueous reaction medium containing same whereby the above mentioned disadvantages are obviated. Other more specific objects will also be hereinafter apparent.

Broadly stated, the process of the present invention comprises purifying α-aminolactams which are dissolved in the impure state in aqueous media, particularly the aqueous reaction mixture resulting from the reduction of α-nitrolactams in water, by adding the aqueous solution of impure α-aminolactam to a hydrocarbon of the benzene series; azeotropically distilling off water from the resulting admixture whereby impurities are precipitated and the purified α-aminolactam is dissolved in the hydrocarbon; then separating the precipitated impurities from the solution of α-aminolactam in hydrocarbon and, if desired, isolating the α-aminolactam from this solution.

The success of the invention is due, at least in part, to the discovery that the α-aminolactams are highly soluble in the indicated hydrocarbons at elevated temperatures, whereas the impurities, which are also primarily amino compounds, do not dissolve in them. This result is unexpected inasmuch as these hydrocarbons are non-polar liquids and it would normally be expected that both the readily water-soluble α-aminolactams and the impurities associated therewith would dissolve less readily in these non-polar liquids.

A particularly desirable advantage of the present process is that the hydrocarbons which are used possess the property of forming azeotropic mixtures with water which have boiling points, whether or not at atmospheric pressure, that are so far below the decomposition temperatures of the α-aminolactams, that the latter are not liable to decompose when the water is removed from the liquid by azeotropic distillation.

Hydrocarbons suitable for use in the process of the present invention include, for example, benzene, toluene, and xylene. Although a mixture of water with toluene has a higher azeotropic boiling point than a mixture with benzene, and the solubility of α-aminolactam is higher in benzene than in toluene, toluene is preferably used since this permits a much lower hydrocarbon/water ratio in the azeotropic mixture and less toluene is needed to remove the water.

The aqueous α-aminolactam solution obtained by the reduction of an α-nitrolactam will normally have an aminolactam concentration of between 10 and 40% by weight. Usually, it is preferred to concentrate this solution to, for example, 70 to 90% by weight aminolactam before the solution is added to the hydrocarbon. Prior to concentration, the balance of the aqueous α-aminolactam solution will usually comprise from 90 to 55% water; 0.2 to 2% unreduced α-nitrolactam and 0.2 to 2% hydrolysis product of the α-aminolactam, catalyst residue and/or other impurities. Concentration of the solution has the advantage that in the subsequent azeotropic distillation a smaller amount of the hydrocarbon is needed to expel the water. Concentration may be suitably effected by evaporating the solution in vacuo in a circulation evaporator.

If desired, all of the aqueous α-aminolactam solution may be added at one time to the hydrocarbon followed by distillation of the water. However, it is preferred to add the aminolactam solution gradually to the hydrocarbon and to distil the water simultaneously and at the same rate as that at which it is introduced. In this way, the purification may be carried out continuously.

As will be appreciated from the foregoing, the impurities precipitate, when the water is being azeotropically distilled off, while the α-aminolactam dissolves in the hydrocarbon. After the precipitate has been separated from the solution, the α-aminolactam may be recovered by evaporation of the liquid or by crystallization.

The amount of hydrocarbon utilized for present purposes can be widely varied. Broadly stated, the amount of hydrocarbon utilized should be sufficient to dissolve all of the α-aminolactam. Under normal circumstances, from 0.5 to 1.5 liters of hydrocarbon per 100 grams of α-aminolactam will be sufficient for carrying out the invention. Stated in another way, this would mean from 12 to 150 liters of hydrocarbon per each liter of water in the aqueous solution of α-aminolactam subjected to treatment.

The azeotropic distillation according to the invention will usually be carried out at a temperature between 69 and 140° C. at atmospheric pressure. However, it will be recognized that temperatures outside this range may also be used.

The invention is illustrated by the following example in connection with the purification of α-aminocaprolactam. However, this example is only given for purposes of illustration and without intending to restrict the invention thereto since α-aminovalerolactam, α-aminooenantholactam and other α-aminolactams containing more carbon atoms, e.g. up to 12 carbon atoms or more, can also be treated in accordance with the present invention.

*Example*

1325 g. of an aqueous α-aminocaprolactam solution, obtained by reduction of α-nitrocaprolactam in an aqueous medium with the aid of a Raney-nickel catalyst and containing 185.5 g. of α-aminocaprolactam, 4.0 g. of lysine and 1.3 g. of α-nitrocaprolactam, was evaporated at 40° C. in vacuo in a circulation evaporator until a 90% solution was obtained, after the catalyst had first been removed by filtration.

The resulting solution, colored blue by the nickel complexes present, was gradually added to 1200 ml. of boiling toluene with simultaneous removal of the water by azeotropic distillation. The impurities then precipitated.

After filtration an almost colorless toluene solution was obtained, from which 185.0 g. of α-aminocaprolactam, which was free from α-nitrocaprolactam and contained only 0.5% of lysine, was recovered by evaporation.

The efficiency of the purification was 99.2%.

It will be appreciated that various modifications may be made in the foregoing without deviating from the scope of the present invention as defined in the following claims wherein:

We claim:

1. A process for purifying impure α-aminolactam in aqueous solution, said impure α-aminolactam being the reaction product obtained by reducing α-nitrolactam in an aqueous medium which comprises adding the aqueous solution of impure α-aminolactam to a hydrocarbon of the benzene series, distilling off water azeotropically from the resulting mixture whereby impurities are precipitated and the α-aminolactam is dissolved in said hydrocarbon and separating the precipitated impurities from the solution of α-aminolactam in hydrocarbon.

2. The process of claim 1 wherein said hydrocarbon is toluene.

3. The process of claim 1 wherein said aqueous α-aminolactam solution is added gradually to said hydrocarbon while the latter is boiling and water is simultaneously distilled off azeotropically at the same rate as that at which it is added.

4. The process of claim 1 wherein said aqueous solution is concentrated prior to being added to the hydrocarbon.

5. The process of claim 1 wherein said α-aminolactam is α-aminocaprolactam.

6. A process for purifying the impure α-aminocaprolactam obtained in aqueous solution by reducing α-nitrocaprolactam in an aqueous media which comprises concentrating said solution by evaporating water therefrom; thereafter gradually adding the concentrated solution of α-aminocaprolactam to boiling toluene whereby water introduced into said toluene is azeotropically distilled off; regulating the addition of said solution to said toluene so that water is azeotropically distilled off at the same rate as water is introduced into said toluene; and thereafter separating impurities which are precipitated from the resulting solution of purified α-aminocaprolactam in toluene.

7. The process of claim 6 wherein the α-aminocaprolactam is separated from solution in toluene by evaporating said toluene.

No references cited.